United States Patent
Fathi et al.

(10) Patent No.: US 12,423,526 B1
(45) Date of Patent: Sep. 23, 2025

(54) INTELLIGENT DETECTION OF BIAS WITHIN AN ARTIFICIAL INTELLIGENCE MODEL

(71) Applicant: U.S. Bank, Minneapolis, MN (US)

(72) Inventors: Ali Fathi, San Francisco, CA (US); Samuel A. Assefa, Dallas, TX (US)

(73) Assignee: U.S. Bank, Minneapolis, MN (US)

( * ) Notice: Subject to any disclaimer, the term of this patent is extended or adjusted under 35 U.S.C. 154(b) by 0 days.

(21) Appl. No.: 19/225,268

(22) Filed: Jun. 2, 2025

Related U.S. Application Data (63) Continuation of application No. 19/062,986, filed on Feb. 25, 2025, now Pat. No. 12,367,349, which is a continuation of application No. 18/421,318, filed on Jan. 24, 2024.

(51) Int. Cl.
| | |
|---|---|
| *G06F 17/00* | (2019.01) |
| *G06F 40/284* | (2020.01) |
| *G06F 40/30* | (2020.01) |
| *G06F 40/40* | (2020.01) |

(52) U.S. Cl.
CPC ............ *G06F 40/30* (2020.01); *G06F 40/284* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 8,543,377 | B2 | 9/2013 | Harris |
| 9,471,851 | B1 | 10/2016 | Cao et al. |
| 10,242,260 | B1 | 3/2019 | Shen et al. |
| 10,467,339 | B1 | 11/2019 | Shen |
| 10,885,279 | B2 | 1/2021 | Barachha |
| 11,475,331 | B2 | 10/2022 | Bhide et al. |
| 11,481,418 | B2 | 10/2022 | Wu |
| 11,816,136 | B2 | 11/2023 | Wu |
| 11,836,438 | B2 | 12/2023 | He |
| 2020/0167653 | A1 | 5/2020 | Manjunath et al. |

(Continued)

OTHER PUBLICATIONS

Bolukbasi, Tolga et al., "Man is to Computer as Woman is to Homemaker? Debiasing Word Embeddings", Neural Information Processing Systems, 2016, 25 pages, arXiv:1067.06520v1.

*Primary Examiner* — Satwant K Singh (74) *Attorney, Agent, or Firm* — Merchant & Gould P.C.

(57) ABSTRACT

A system and method includes receiving input and an identification, calculating a bias direction with respect to the identification for an embedding model used by an initial model, and calculating protected gradient scores for tokens in the input. The protected gradient scores are calculated by determining directional derivatives based on model output and bias direction to generate protected gradients, and calculating dot products of the protected gradients and bias direction. The token-level protected gradient scores are aggregated to form an input-level protected gradient score, which is used to determine a fairness indicator. If the fairness indicator is below a threshold, deployment of the initial model is prevented and the model is retrained or fine-tuned using training data selected based on the fairness indicator and identification to produce a trained model with reduced bias. The training data may be selected by removing biased data or synthetically generating new unbiased data.

20 Claims, 4 Drawing Sheets

(56) References Cited

U.S. PATENT DOCUMENTS

| | | | |
|---|---|---|---|
| 2022/0358288 A1* | 11/2022 | Wan | G06V 30/194 |
| 2023/0153532 A1* | 5/2023 | He | G06N 3/08 |
| | | | 704/8 |
| 2023/0185799 A1* | 6/2023 | Hoang | G06N 3/096 |
| | | | 704/2 |
| 2023/0185834 A1 | 6/2023 | Arthur | |
| 2023/0186026 A1 | 6/2023 | Arthur | |
| 2023/0186161 A1 | 6/2023 | Arthur | |
| 2023/0316003 A1* | 10/2023 | Friedman | G06N 3/0442 |
| | | | 704/9 |
| 2024/0061832 A1* | 2/2024 | Hoang | G06F 40/284 |
| 2024/0061833 A1* | 2/2024 | Tangari | G06F 40/284 |
| 2024/0126924 A1* | 4/2024 | Pabolu | G06N 3/045 |

\* cited by examiner

INTELLIGENT DETECTION OF BIAS WITHIN AN ARTIFICIAL INTELLIGENCE MODEL

CROSS REFERENCE TO RELATED APPLICATIONS

This application claims priority to and is a Continuation of U.S. patent application Ser. No. 19/062,986, filed Feb. 25, 2025, which is a Continuation of U.S. patent application Ser. No. 18/421,318, filed Jan. 24, 2024, which applications are incorporated herein by reference in their entirety.

TECHNICAL FIELD

The present disclosure relates to intelligent detection of bias within an artificial intelligence (AI) model systems and methods.

BACKGROUND

An Artificial Intelligence (AI) model may operate with bias embedded within the AI model. Biased AI models have reduced accuracy and therefore reduced usefulness. It is beneficial but difficult to detect such bias. Detection of bias in an AI model can be useful in determining how to correct such bias as well as how to improve training to reduce bias. Accordingly, a need exists for detection of more specified bias in an AI model in a timely, efficient, and streamlined manner.

Traditional approaches in fairness testing of artificial intelligence models seek outcome fairness by considering the decision pipeline and model pipeline as a black box and test whether a chosen fairness measure is satisfied either at the individual or group level. It is challenging to use the results of outcome fairness testing for debugging and fixing a model. As a result, post processing steps are traditionally added to the model pipeline to correct any unwanted bias. There are also methods that try to build in the fairness requirement to the process of training an AI model.

Research results in the domain of explainable artificial intelligence and natural language processing often cite fairness as a motivation for the work, but the exact relationship between the two concepts is typically left unspecified. Traditional explainable artificial intelligence methods provide explanations through post-hoc processing, leaving open questions about how to automatically identify fairness issues in individual explanations, and how to generalize from local explanations to infer systematic model bias.

BRIEF SUMMARY

In an embodiment, a method may include receiving a text sentence and an identification of a class, calculating a bias direction with respect to the class for an embedding model used by an artificial intelligence model to be analyzed, and, for each token in the text sentence, calculating a protected gradient score. Calculating the protected gradient score includes: calculating a directional derivative based on an output of the artificial intelligence (AI) model based on the token and with respect to the bias direction to generate a protected gradient, and calculating a dot product of the protected gradient and the bias direction, wherein the protected gradient score is based on the dot product. The method may further include aggregating the protected gradient scores of the tokens to form a sentence-level protected gradient score for the sentence, determining a fairness indicator of the AI model based on the sentence-level protected gradient score, and responsive to the fairness indicator being below a threshold, preventing deployment of the AI model.

In another embodiment, a non-transitory computer readable medium having instructions that, when executed by one or more processors may cause the one or more processors to: determine an AI model to test, wherein the AI model is a trained deep learning model such that a gradient of the trained deep learning model with respect to each token of the sentence is calculable, receive a text sentence and an identification of a class, calculate a bias direction with respect to the class for an embedding model used by an artificial intelligence model to be analyzed, and for each token in the text sentence, calculate a protected gradient score. To calculate the bias direction includes to: obtain a corpus of token pairs related to the class, calculate token embeddings for each token of the pairs of the corpus using the embedding model, perform principal component analysis on the embeddings such that variance associated with the class comes to lie on a first principal component that expresses a biased portion of the meaning of the tokens, and determine the bias direction using the first principal component. Calculating the protected gradient score includes to: calculate a directional derivative based on an output of the artificial intelligence model based on the token and with respect to the bias direction to generate a protected gradient, and calculate a dot product of the protected gradient and the bias direction, wherein the protected gradient score is based on the dot product. The instructions further, when executed by the one or more processors, cause the one or more processors to: aggregate the protected gradient scores of the tokens to form a sentence-level protected gradient score for the sentence, determine a fairness indicator of the AI model based on the sentence-level protected gradient score, wherein determining the fairness indicator of the AI model based on the sentence-level protected gradient score includes determining the fairness indicator of the AI model based on multiple sentence-level protected gradient scores calculated for respective different sentences, and responsive to the fairness indicator being below a threshold, providing an alert.

In yet another embodiment, a system may include one or more processors, and memory having instructions that, when executed by the one or more processors, cause the one or more processors to: determine an AI model to test, wherein the AI model is a trained deep learning model such that a gradient of the trained deep learning model with respect to each token of the sentence is calculable, receive a text sentence and an identification of a class, calculate a bias direction with respect to the class for an embedding model used by an artificial intelligence model to be analyzed, and for each token in the text sentence, calculate a protected gradient score. To calculate the bias direction includes to: obtain a corpus of token pairs related to the class, calculate token embeddings for each token of the pairs of the corpus using the embedding model, perform principal component analysis on the embeddings such that variance associated with the class comes to lie on a first principal component that expresses a biased portion of the meaning of the tokens, and determine the bias direction using the first principal component. Calculating the protected gradient score includes to: calculate a directional derivative based on an output of the artificial intelligence model based on the token and with respect to the bias direction to generate a protected gradient, and calculate a dot product of the protected gradient and the bias direction, wherein the protected gradient score is based on the dot product. The instructions that, when executed by the one or more processors, may further cause the one or more processors to: aggregate the protected gradient scores of the tokens to form a sentence-level protected gradient score for the sentence, determine a fairness indicator of the AI model based on the sentence-level protected gradient score, wherein determining the fairness indicator of the AI model based on the sentence-level protected gradient score includes determining the fairness indicator of the AI model based on multiple sentence-level protected gradient scores calculated for respective different sentences, and responsive to the fairness indicator being below a threshold, providing an alert.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein and in greater detail below, detection of such biases in an AI model is based on biased proxies in a text that point indirectly to membership of a term in a protected class to evaluate fairness in the AI model. The detection can provide a measure as to what portion of an overall token-sensitivity of an output (e.g., prediction) of the model on a text sample is associated with a given a specific group (e.g., a specific protected group, such as race, gender, and the like) originates from biases inherent in the token representations.

While discussion herein is often focused on unwanted bias with respect to particular protected groups or classes, the techniques herein can be more broadly applied to detecting bias in other groups or contexts. For example, rather than determining the relevance of unwanted bias among male and female, techniques herein can be used to determine the relevance of desirable bias within a model (e.g., friendliness) or merely the relevance of a particular class within the model. Further, while the application describes concepts such as "unfairness", "protected class", and "unwanted", such terms are for ease of understanding example use cases of the technical invention disclosed herein. The definiteness of such terms is irrelevant to the technical invention and can be determined by the user according to their own use case. In other words, a person of skill in the art having benefit of the technical disclosure herein may apply their own definitions of terms (and other similar terms) and will understand how to apply the technology herein to their own particular use cases. For example, bias in a machine learning model used to make employment decisions would be unwanted. As another example, a user may want to use a machine learning model or embedding to understand bias inherent in a training or text corpus and view how underlying bias affects output. In such an example, retaining such bias is desirable because the investigation of such bias is the desired outcome. In an example, a class is a "protected class" if it is identified as such under the laws of the jurisdiction in which the AI model will operate.

Embodiments include encoding the meaning of token (e.g., a word or part of a word) as a point in mathematical space (e.g., in the form of token vectors or embeddings) using an embedding model and encoding sematic relations of the token. A semantic relation can be a relationship between two meanings or definitions, such as linguistically. A semantic relation can be used to express the extent to which a token is related to a concept (e.g., a protected class). For instance, a model express a high semantic relation between the tokens for "president" and "male". The semantic relations can be expressed geometrically as directions within vector space corresponding to an axis extending between two extremes (e.g., there may be a male-female axis within the vector space where being close to one end indicates a higher end of semantic relation to "female", the other end "male", and the middle as relatively lacking a semantic relation to those concepts). Thus a relative position of a token along that axis can be expressed as a weight to signify a degree of association between the token and either or neither of the components of the pair.

Embodiments herein may be used to provide explainability for AI models. The explainability can relate to predictions and fairness of predictions or other output the AI model. For a given prediction (e.g., output) of the AI model on a text sample (e.g., input), such as a sentence, document, or the similar text product, and for a specified group (e.g., race, gender, or other protected class), a measure can be generated as to what portion of an overall-token sensitivity of the prediction of the AI model originates from biases inherent in the token representations used by AI model or internal processes of the AI model that operate on the token representations. Bias directions can be determined and used to generate a protected gradient score. The bias directions can be further used to generate a modified saliency score indicative of a protected gradient based on the notion of gradient saliency and determination of a directional derivative as described herein. Examples herein can calculate a protected status associate with a portion of a gradient space (representative of sensitivity) for tokens with respect to indirect proxies for one or more protected group(s) as protected class(es) to determine undesired sensitivities and model fairness.

An AI model being analyzed use encodings of a meaning of tokens in the text sample (e.g., sentence) as a point in a mathematical space (e.g., in the form of word vectors or word embeddings) formed by an embedding model. Semantic relations such as male-female, white-black, king-queen, and the like are encoded geometrically as directions or vectors such that, for any given semantic relation as a semantic group, a weight can be assigned to each token indicative of a degree of association between the token and the semantic group. A text sample such as a text sentence of a prediction of the AI model to calculate a bias direction for each token of the text sentence. The bias direction can be determined as an undesirable semantic relation in an embedding space. A protected gradient score of the AI model is then calculated for each token in the text sentence. The protected gradient score can be indicative of a part or portion of sensitivity of the model originating from the association of the token to the given semantic relation (e.g., 40% of model sensitivity due to the specified protected class and associated with the protected gradient score, wherein 60% is indicative of a general context based bias associated with the bias direction).

As a non-limiting example, a prediction of the AI model of the term "cricket" may have a general bias sensitivity of 60% due to general context (e.g., based on the bias direction and notion of gradient saliency), and 40% because of a protected class of national origin (e.g., based on the protected gradient as a modified saliency measure). In a non-limiting example, such a token can proxy membership in a protected class. In an embodiment, baseball versus cricket appearing on a resume may indirectly reference to race, ethnicity, or national original, each of which may be a protected class, such that the AI model may output an unfair prediction of the resume listing baseball over the resume listing cricket as a better candidate for a leadership prediction with an underlying analysis of the candidate associated with the term baseball being Caucasian and/or a United States citizen while the candidate associated with the term cricket being South Asian and/or a non-United States citizen.

The calculated protected gradient score for the tokens can then be aggregated using any of a variety of techniques to product a sentence-level protected gradient score. The lower the sentence-level protected gradient score, the fairer the model per an associated fairness indicator based on the sentence-level protected gradient. As described herein, the undesired sensitivity of the AI model to the biased component of a meaning of a given token as the protected gradient score may be measured based on a directional derivative of the model output (e.g., a vector of the model gradient vector representative of the model sensitivity to the token) with respect to the bias direction vector (e.g., the bias direction in the embedding space, which is computed for the tokens of a sentence based on a collection of token vectors representing a notion of bias to be quantified). Calculation of the token-level protected gradient score may be determined by calculating the dot product of the model gradient vector and the bias direction vector for the token. Thus, examples can observe that the calculated token-level gradient saliencies as protected gradient scores are quantified as directional derivatives mathematically and modify the gradient saliency by defining the protected gradient as the directional derivative with respect to the semantic relation and associated bias direction.

In embodiments, a token embedding is determined for each token of the text sentence. The token embedding may be projected geometrically on the bias direction to extract a degree of bias toward the meaning of each token as a bias score. The token-vector is projected in the embedding space onto the bias subspace. The greater the bias score (whether it is positive or negative), the greater the semantic relation is between the token and the concept expressed by the bias direction. For example, where the protected class is gender, a positive bias score may be indicative of a female associated token, a negative bias score is indicative of a male associated token, and a bias score close to zero may indicate a relative lack of bias.

Examples can be used to improve the accuracy and fairness of AI models, thereby improving artificial intelligence technology. Biased AI models tend to be less accurate than less biased AI models. However, bias in AI models can be difficult to detect. Examples herein can be relevant to more accurate detection of bias in models.

Flow Diagram

Figure 1:
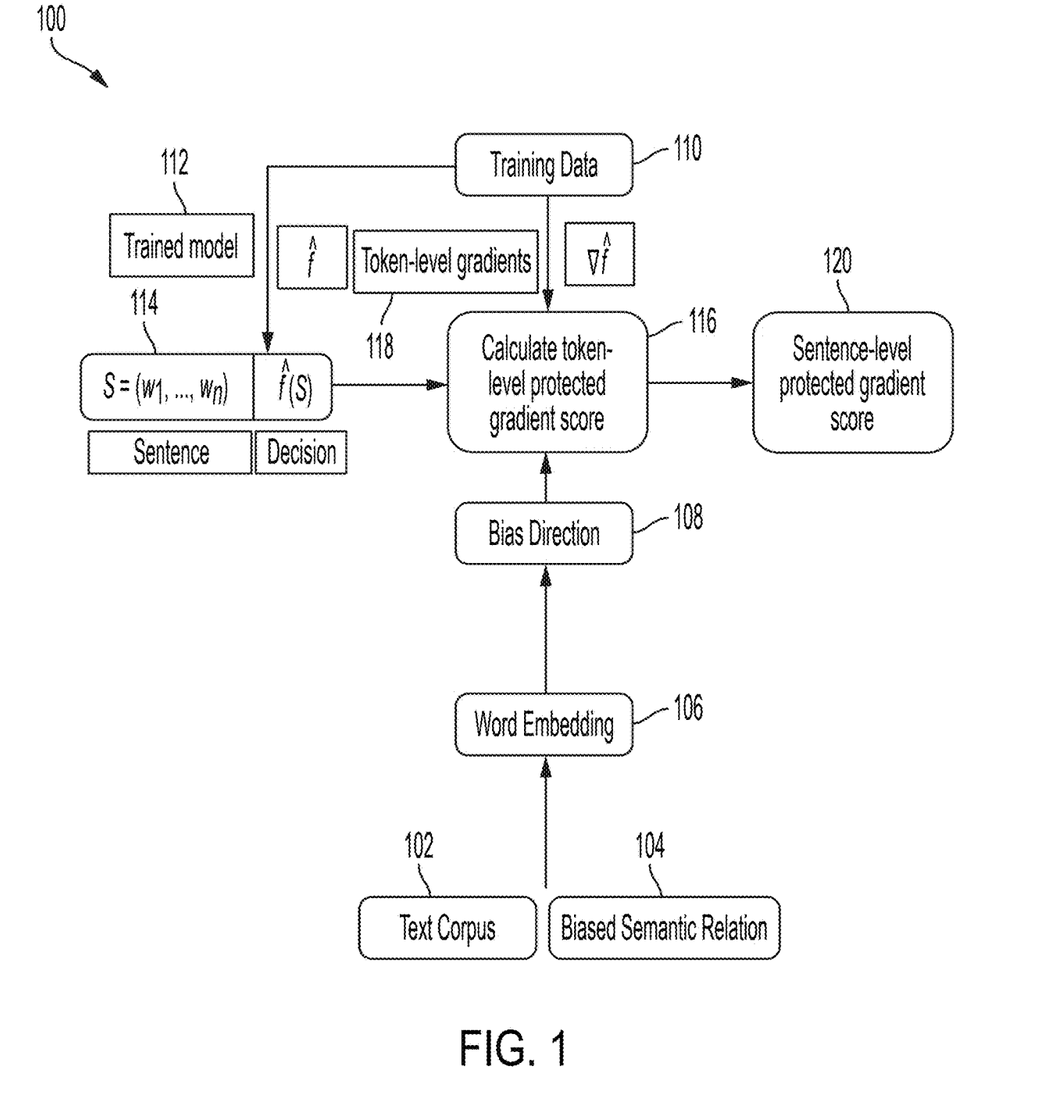
FIG. 1 schematically depicts an AI model bias detection system, according to one or more embodiments described and illustrated herein.

FIG. 1 illustrates a flow diagram of system 100 for calculating the effect of bias on the output of an AI model. The flow illustrates the calculation of a protected gradient score for the output of an AI model.

Within the diagram of system 100, blocks 110-114 describe a model and its training. Training data of block 110 is used to train a base model to form a trained model 112. The trained model 112 is the model for which bias will be detected. The training can occur in any of a variety of ways depending on the desired model and the nature of the training data. Training examples and descriptions of various models are shown and described in relation to FIG. 4, infra. In the illustrated example, the training data of block 110 is made up of input in the form of sentences and decisions that represent the desired output of the trained model 112 in response to the input. In an example, the trained model 112 may be associated with a deep learning architecture and may be used for text classification. In an example, the AI model is a natural language processing model used for text processing (e.g., classification). In other examples, the AI model may be a generative model, a large language model another model, or combinations thereof.

Within the diagram of system 100, blocks 102-108 illustrate the determination of a bias direction 108. In certain examples, the bias direction 108 is or is defined by a set of one or more vectors expressing or representing a bias subspace. In many examples, the bias direction 108 expresses or represents a line or continuum (e.g., in multi-dimensional space). Movement along the bias direction 108 can modify the bias's contribution. Such modifications can be used to relatively isolate a change along the bias direction (e.g., increase or decrease an amount of "maleness" or "femaleness") and observe the results on the output. A bias direction can be determined in any of a variety of ways. In the illustrated example, the bias direction is calculated by a gathering a corpus 102 of token pairs related to the protected class or a semantic relation 104 to be examined (e.g., a biased semantic relation). The corpus 102 can be selected (e.g., manually by a user or automatically by a process) that express opposite ends of the continuum associated with the biased semantic relation 104. Where the biased semantic relation 104 is gender, the corpus 102 can be made up of pairs of tokens selected that primarily vary along that semantic relation 104, such as: ("male", "female"), ("he", "she"), ("son", "daughter"), and the like. Such pairs can be selected to emphasize that one of the most important differences between those tokens is the class that is of semantic relation 104 of interest (here, gender).

Token embeddings 106 are then calculated for each token of the pairs of the corpus 102. An embedding model (e.g., WORD2VEC, GLOVE, BERT, TEXT-EMBEDDING-ADA-002 by OPENAI, or the like) can be used to produce the embeddings 106. In some instances the embedding model is part of the model 112. The embedding model can be a same embedding model used to create embeddings used in the training that produced the trained model 112. The embedding model can be the same embedding model used to pre-process input processed by the trained model 112. In some examples herein, the focus can be on bias present in the model, rather than bias present in the embeddings. In such examples, embeddings are taken as a given and the focus is on detecting potential bias in the downstream model (e.g., a text classifier) that uses the embeddings.

With the embeddings 106 created, the bias direction 108 can be determined. A principal component analysis (PCA) performed on the embeddings 106. For a corpus 102 having well-chosen collection of pairs, the greatest variance of the embeddings 106 corresponds to the semantic relation 104 of interest (e.g., gender), so variance associated with that semantic relation 104 comes to lie on the first principal component. In other words, the first principal component expresses the biased portion of the meaning of the tokens. The first principal component can be referred to as or used to express the bias direction 108. Other tokens can be embedded in the same vector space and projected along this bias direction. The resulting relative position of the token along this bias direction can be used to indicate a relative level of bias associated with that token (as produced by the embedding model).

The meaning of points along the bias direction will depend on how the pairs are set up. For instance, the above example related to gender results in a bias direction that establishes a continuum between a first extreme associated with a semantic gender associated with "male", "he", and "son" and a second extreme associated with a semantic gender associated with "female", "she", and "daughter". The bias direction can be used to determine an association between a given token and the bias. For example, the token "nurse" may be investigated. The token is converted into an embedding using an embedding model. The embedding is them projected onto the bias direction (i.e., its relative position along the bias direction is determined) used to determine a relative bias between "male" and "female" given the token "nurse" by the embedding model. Depending on the use case, the user may determine that an undesirable level of bias in embedding model exists (e.g., unfair based on a predetermined threshold).

At block 116, a token-level protected gradient score 118 of the trained model 112 is calculated for each token in the sentence 114. The protected gradient score can be numeric value expressing the extent to which a prediction of the model depends on the semantic association of the prediction with the protected class. For example, the protected gradient score can be used to express an undesired sensitivity of the model to the biased component of the meaning of a given token. In an example, the token-level protected gradient score is indicative of a protected sensitivity of the AI model for each token with respect to a protected class. In an example, the undesired sensitivity is measured by calculating the directional derivative of the model output with respect to the bias direction 108. A protected gradient score of a prediction (e.g., at the word or token level) can be calculated by performing a mathematic dot protect operation on a model gradient vector and the bias direction vector. The bias direction can be a unit vector or the bias direction may have an unnormalized magnitude.

The model gradient vector can be a gradient vector of the AI model. The AI model may be a deep learning model such that gradients of the trained model with respect to each token of a sentence are calculable. A notion of token-level model gradient for natural language processing may be mathematically equivalent to taking a directional derivate, which measures how much a multi-variant function changes if an input is perturbed toward a certain direction. As descried herein, an undesired sensitivity of the AI model to the biased component of a meaning of a given token may be measured by calculation of a directional derivative of the model output of the AI model (e.g., model gradient vector) with respect to the bias direction vector determined above to generate the protected gradient score. A directional derivative of a model gradient vector of the AI model is calculated with respect to the bias direction.

Calculation of the protected sensitivity (e.g., a fairness indicator of the prediction, such as the decision, of the AI model) for a protected class can take as an input (1) a vector of the model gradient vector of the AI model representative of sensitivity of the model to a token and (2) a bias direction in an embedding space. In an example, the model gradient vector is determined based on training data of block 110 utilized for the trained model 112 to generate the model gradient vector as part of the decision of the AI model based on tokens of the sentence 114. The bias direction is computed based on a collection of token vectors representative of a notion of bias to quantify, such as based on a semantic relation 104 (e.g., gender, race, or another semantic relation of interest).

A token-level protected gradient score 118 can be calculated for each token in the sentence 114 by repeated the process for each token.

After calculating the protected gradient score of the AI model for each token in block 116, an aggregate protected gradient score at a sentence-level is calculated in block 120 as a sentence-level protected gradient score. When determining such a bias, a protected gradient score is calculated as a sentence-level protected gradient score in block 120 for a decision (e.g., prediction) of the AI model used to classify a sentence. An input used to detect the bias in the AI model 112 may be a sentence 114 as classified by the AI model (e.g., the text sentence as the output of the AI model to be analyzed for bias detection to be input as the text corpus 102). In some examples, the sentence 114 is part of the training data of block 110 used to train (or validate) the trained model 112. An output of the flow can be representative of a score indicative of how much of an overall sensitivity of the AI model 112 to the changes in the tokens of the sentence 114 originates from the associated of the tokens to a semantic relation representing bias (e.g., the biased semantic relation 104).

In block 120, the calculated token-level protected gradient scores for each token can be aggregated for all tokens in the sentence 114 to produce a sentence-level protected gradient score. The aggregation can be performed in any of a variety of ways depending on the way in which the end user wants to use the data. In examples, the aggregation can be performed using statistical techniques including but not limited to one or more operations selected from the group consisting of: mean, median, mode, and standard deviation. In some examples, the aggregation includes performing normalizations to take into account length of sentences and the like, such as by determining bias on a per token basis or by extrapolating a bias for a predetermined sentence length. When analyzing the result, the lower the protected gradient score, the less of an effect the bias has on the model.

The systems and methods described herein can thus be used to explain to what extent an individual prediction made by the AI model (e.g., the trained model 112) may depend on biased proxies in the text, such as those that point directly or indirectly to membership in a protected class or other semantic relations. The extent may be determined as a fairness indicator, as described herein, of the prediction of the AI model based on a sentence-level protected gradient score determined in block 120.

Example Process

Figure 2:
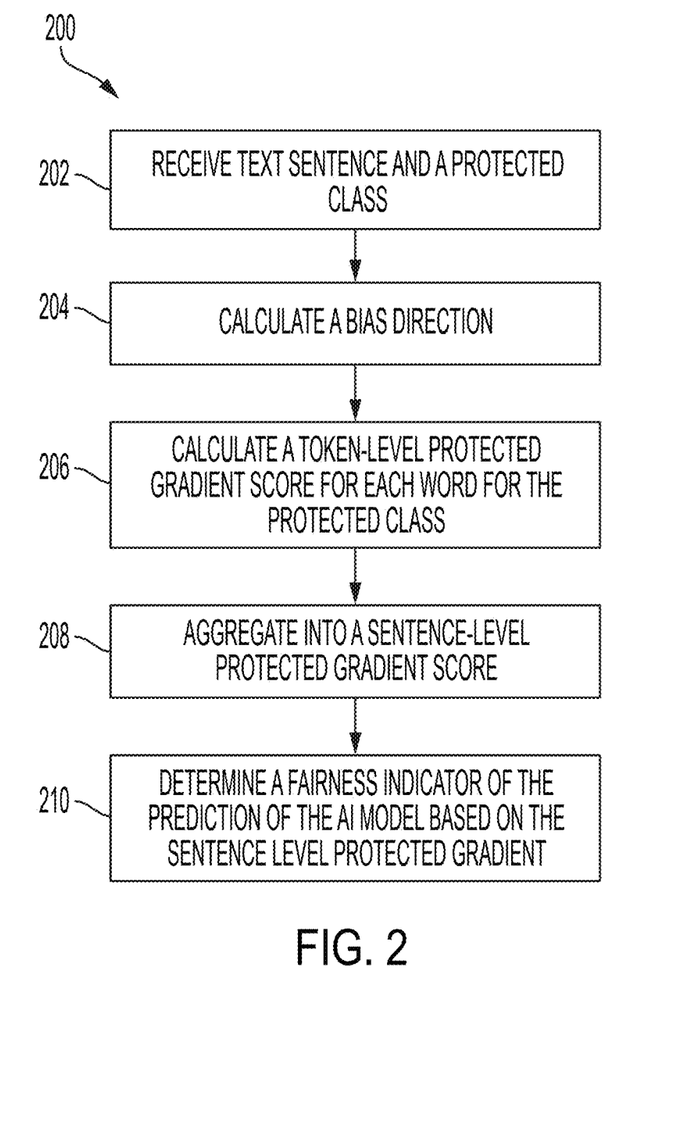
FIG. 2 schematically depicts a process of implementing the AI model bias detection system of FIG. 1, according to one or more embodiments described and illustrated herein.

Referring to FIG. 2, an example process 200 of implementing AI model bias detection. is depicted. In embodiments, a non-transitory computer readable medium (such as memory 314 of computing environment 300 described in greater detail further below) has instructions that, when executed by one or more processors (such as processor(s) 312 of computing environment 300 described in greater detail further below), cause the one or more processors to perform one or more of the operations or features described in relation to the process 200 and other processes and features described herein. The process 200 may be a computer and software based implemented method as described herein. A system, such as the AI model bias detection system 100, may include or be implemented using one or more processors and memory having instructions that, when executed by the one or more processors, cause the one or more processors to perform the features of the process 200 and other processes and features described herein.

The illustrated process 200 begins with block 202, which includes receiving a text sentence, an indication of a protected class, and a prediction of an AI model on the text sentence. The process 200 can be directed to determining what extent the prediction (as an individual prediction) made by the AI model used for text classification, the AI model being analyzed by the AI model bias detection system 100, depends on biased proxies in the text that point indirectly to membership in the protected class. In some examples, the bias or fairness determination is performed on a prediction-by-prediction basis and can be used to determine an extent to which each prediction is influenced by bias. The prediction can be an output of the model.

In an example, the sentence is obtained from a training set or validation set. In addition or instead, the sentence may be specifically chosen or generated (e.g., using a large language model) to interrogate the role of bias in the AI model. For example, the sentence may be selected or generated with terms that are related to the protected class (e.g., explicitly or implicitly and correctly or incorrectly). As described herein, a text sentence may include a series of tokens, and each token be represented by one or more tokens such that a token as referenced herein is representative of a word or a portion of a word. In some examples, more than one sentence can be used. The sentence can be a sentence that is provided as input to the model to produce an output.

In embodiments, the protected class may be any grouping that qualifies for special protection by a law or policy in a relevant jurisdiction. Examples can include but need not be limited to race, religion, national origin, age, sex, sexual orientation, gender identity, pregnancy, familial status, disability status, veteran status, genetic information, others, or combinations thereof. In some examples, the process 200 is repeated for list of multiple classes of interest to determine whether or to what extent bias exists in relation to the class in question. As described elsewhere herein, while explainability has been an area of special focus with respect to protected classes, non-protected classes or other groupings of interest may be used or interrogated using techniques described herein. Further, while the class received in block 202 may be sufficient on its own, one or more sub-classes may be chosen or used to enhance the quality of information determined.

In block 204, a bias direction is calculated. In some examples, a separate bias direction is calculated for each token or a same bias direction is used for each word. In examples, the bias direction exists independently of the model being tested and is instead intrinsic to the embedding model used by the model being tested. The bias direction can be calculated with respect to the protected class for the embedding model used by the model being tested. In embodiments, a collection of word (or token) pairs is gathered or generated. The collection may include tokens belonging to the semantic relation associated with the protected class. For example, where the protected class is related to gender, word pairs in the collection may include: ("male", "female"), ("he", "she"), ("his", "her"), ("son", "daughter"), and the like. Such pairs may be predetermined (e.g., manually determined) for each protected class of interest. A principal component analysis (PCA) may be performed on the collection of word pairs of a difference of word-vectors for each word pair of the collection to generate respective PCA vectors, and the bias direction extracted from each word embedding and the respective PCA vector. An example technique for performing PCA is described in Bolukbasi, Tolga et al. "Man is to Computer Programmer as Woman is to Homemaker? Debiasing Word Embeddings." *Neural Information Processing Systems* (2016), which is incorporated herein by reference in its entirety for any and all purposes. The semantic relation for each word of the word pair can be encoded geometrically using the PCA to form the bias direction in the embedding space. A weight may be assigned to the word indicative of a degree of association between the word and the semantic relation.

Thus, the process 200 gathers a collection of word pairs that belong to the semantic relation. As a non-limiting example, for a gender bias as a protected class, the word pairs may include he-she, his-her, son-daughter, and the like. Word embeddings may be calculated for each word and the PCA performed on the collection of word pairs for a difference of the word-vectors for each pair. Top PCA vectors may capture a biased portion of the word meaning (e.g., the extent to which the word is a proxy for membership in the biased semantic relation). With a bias direction extracted from the word embedding, a degree of bias toward the meaning of each word can be extracted by projecting the word embedding geometrically on the bias direction to generate a bias score. As a non-limiting example, for the case of gender bias, a positive bias score may be indicative of a highly female associated word (e.g., the word "nurse"), and a negative bias score would signify a male associated word (e.g., the word "doctor").

In block 206, a token-level protected gradient score is calculated for each token in the sentence.

In embodiments, the token-level protected gradient score is indicative of sensitivity of the AI model for each token originating from an association of each word to the semantic relation. As a non-limiting example, the token-level protected gradient score is indicative of a sensitivity measure of the AI model for each token. The sensitivity measure is representative of a percentage of an overall-token sensitivity of the prediction originating from a bias inherent in the token based on the protected class.

The token-level protected gradient score may be determined by performing a mathematic dot product operation on the model gradient vector of the AI model and the bias direction vector for each respective token in the text sentence to determine the directional derivative representative of the token-level protected gradient.

In block 208, the token-level protected gradient score is aggregated for each token in the text sentence to determine a sentence-level protected gradient score. The aggregation may be a summation, product, average, standard deviation calculation, another statistical process, or other appropriate aggregation method.

In block 210, a fairness indicator of the prediction of the AI model is determined based on the sentence-level protected gradient score. The fairness indicator may be indicative of an extent the prediction of the AI model used for text classification for the text sentence depends on biased proxies of respective tokens in the text sentence, the biased proxies pointing indirectly to membership in the protected class.

In examples, the fairness indicator is determined such that the lower the sentence-level protected gradient score, the higher the fairness indicator to indicate the prediction to be fairer than for a higher sentence-level protected gradient score. When the fairness indicator is equal to or below a predetermined fairness threshold, the prediction of the AI model may be determined to be fair and acceptable for use. A developer of the AI model may accordingly notified such that the AI model may be approved for use.

When the fairness indicator is below the predetermined fairness threshold, the prediction of the AI model may be determined to be unfair and unacceptable for use as the fairness indicator is indicative of a model sensitivity to an unfair bias based on the protected class. The developed of the AI model may be notified of the fairness indicator indicative of the unacceptable model sensitivity to the unfair bias based on the protected class to adjust the model sensitivity to attempt to achieve and/or until arriving at a level at or below the predetermined fairness threshold per the implementation of the features and control schemes described herein. For example, an alert can be provided.

The fairness indicator falling below a predetermined fairness threshold may trigger remediation of the lack of fairness. For example, a different embedding model can be used, the embedding model can be trained, the embedding model can be refined, the AI model can be trained, the AI model can be retrained, the AI model can be finetuned, new training data can be obtained, new training data can be generated (e.g., synthetically generated taking data, such as using a large language model), certain of the training data can be excluded as encoding too high of a bias (e.g., a bias score of a sentence in the training data can be calculated and, if too high, be excluded), other remediations can be performed, or combinations thereof. New training data can be based on the protected class and selected to reduce bias. In examples, the process 200 is repeated until a bias of the model is below a threshold level of bias (or above a threshold level of fairness). Once bias is below a bias threshold (or above a fairness threshold), the AI model (or a remediated AI model) may be deployed in production or otherwise used.

In some examples, the fairness indicator is determined based on multiple sentence-level protected gradient scores calculated based on multiple sentence-level protected gradient scores calculated for respective different sentences. In such an example, the fairness can be determined across a wider range of scenarios and can lead to a more accurate determination of the fairness of the model. In some instances, there is a single fairness indicator for each protected class. In other examples, the fairness is determined for multiple protected classes. For example, the process can be repeated for the same or different sentences with respect to different protected classes. The model may have different levels of fairness or unfairness for the different protected classes.

In an example, there may be an automated or semi-automated test suite configured to test AI models for bias based on a predetermined set of classes (e.g., protected classes). The test suite may calculate fairness indicators for the AI model being tested for each of the predetermined set of classes. The calculated fairness indicators can be put into a report that is provided to a developer such that the developer is able to understand a fairness of the AI model. Thus, the developer can judge whether to deploy the model.

The developer can further use the fairness to assess a quality of training data used to train the AI model.

Bias detection examples include, a representation of tokens as points in a mathematical space (e.g., an embedding space), finding the semantic/bias directions in the embedding space and calculating a gradient saliency to further produce a modification of the gradient saliency as a protected gradient score. The protected gradient score is indicative of an undesired sensitivity of the AI model to the bias component of the input of tokens. Thus, bias in the AI model (as an AI language model) used for text classification may be detected and mitigated. For each token in an input sentence, the process 200 may measure to what extent the prediction of the AI model depends on the semantic association of the token with a protected class as a determined protected gradient. The protected gradient score points to the undesired sensitivity of the model on a semantic aspect of a token. The protected gradient score is calculated based on an extraction of the semantic directions in token embedding spaces and formulation of the AI model sensitivities as mathematical directional derivatives of the AI model with respect to the semantic direction vector.

Computing Environment

Figure 3:
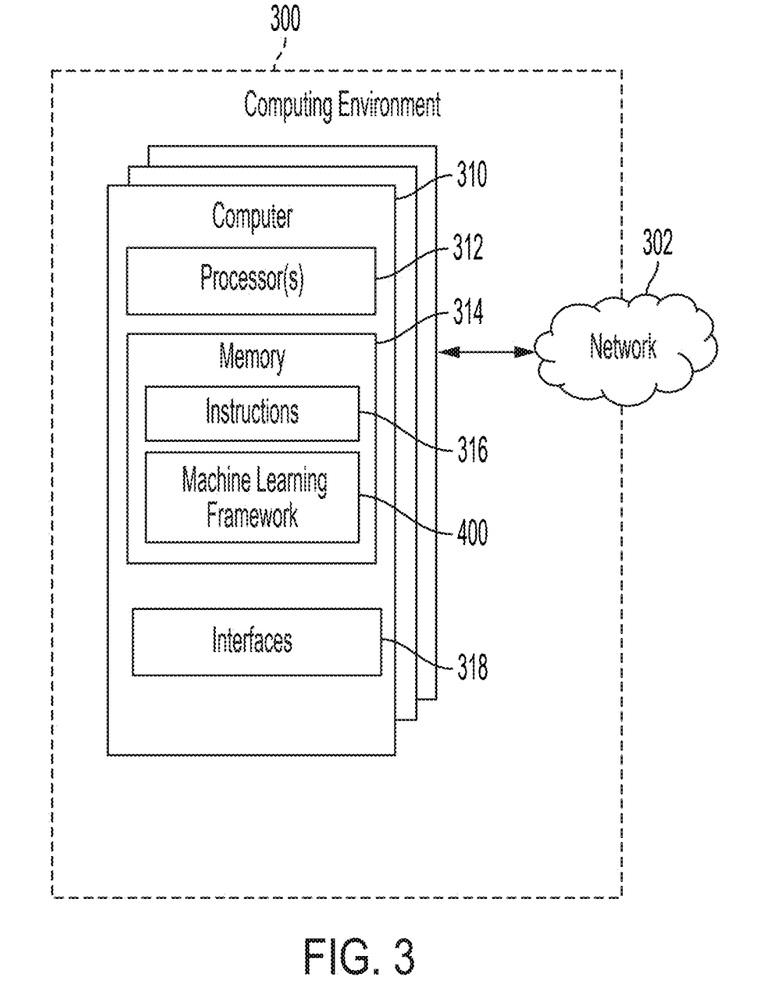
FIG. 3 schematically depicts a computing environment for use with the AI model bias detection system of FIG. 1 and for implementing computer and software based processes as set forth in FIG. 2, according to one or more embodiments described and illustrated herein.

FIG. 3 discloses a computing environment 300 in which aspects of the present disclosure may be implemented. The computing environment 300 may be utilized by the AI model bias detection system 100 of FIG. 1 as described herein. The AI model bias detection system 100 may be implemented using the computing environment 300. A computing environment 300 is a set of one or more virtual or physical computers 310 that individually or in cooperation achieve tasks, such as implementing one or more aspects described herein. The computers 310 have components that cooperate to cause output based on input. Example computers 310 include desktops, servers, mobile devices (e.g., smart phones and laptops), wearables, virtual/augmented/expanded reality devices, spatial computing devices, virtualized devices, other computers, or combinations thereof. In particular example implementations, the computing environment 300 includes at least one physical computer.

The computing environment 300 may specifically be used to implement one or more aspects described herein. In some examples, one or more of the computers 310 may be implemented as a user device, such as mobile device and others of the computers 310 may be used to implement aspects of a machine learning framework useable to train and deploy models exposed to the mobile device or provide other functionality, such as through exposed application programming interfaces.

The computing environment 300 can be arranged in any of a variety of ways. The computers 310 can be local to or remote from other computers 310 of the environment 300. The computing environment 300 can include computers 310 arranged according to client-server models, peer-to-peer models, edge computing models, other models, or combinations thereof.

In many examples, the computers 310 are communicatively coupled with devices internal or external to the computing environment 300 via a network 302. The network 302 is a set of devices that facilitate communication from a sender to a destination, such as by implementing communication protocols. Example networks 302 include local area networks, wide area networks, intranets, or the Internet.

In some implementations, computers 310 can be general-purpose computing devices (e.g., consumer computing devices). In some instances, via hardware or software configuration, computers 310 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 310 include one or more processors 312, memory 314, and one or more interfaces 318. Such components can be virtual, physical, or combinations thereof.

The one or more processors 312 are components that execute instructions, such as instructions that obtain data, process the data, and provide output based on the processing. The one or more processors 312 often obtain instructions and data stored in the memory 314. The one or more processors 312 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 312 include at least one physical processor implemented as an electrical circuit. Example providers processors 312 include INTEL, AMD, QUALCOMM, TEXAS INSTRUMENTS, and APPLE.

Figure 4:
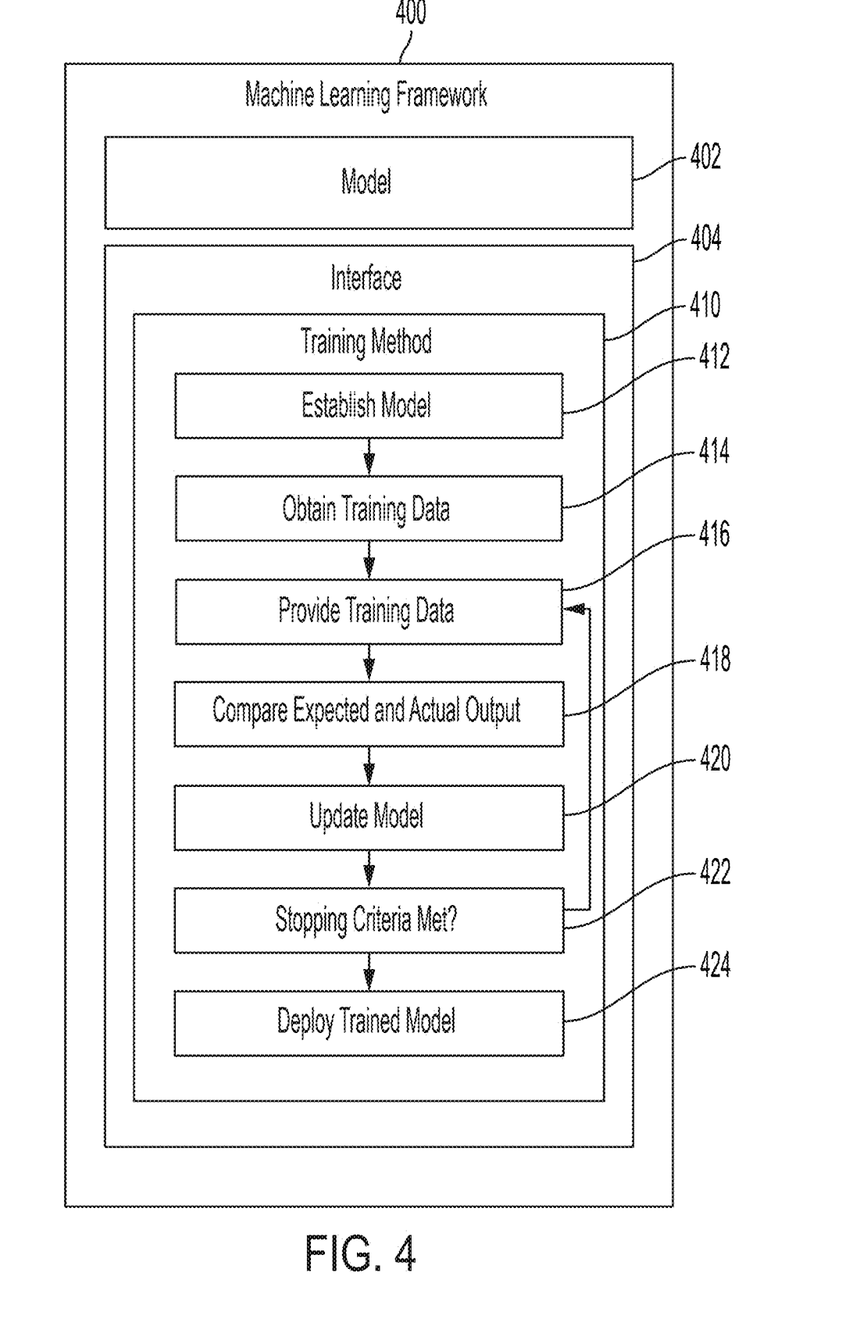
FIG. 4 schematically depicts a machine learning framework for use with the AI model bias detection system of FIG. 1 and for implementing computer and software based processes as set forth in FIG. 2, according to one or more embodiments described and illustrated herein.

The memory 314 is a collection of components configured to store instructions 316 and data for later retrieval and use. The instructions 316 can, when executed by the one or more processors 312, cause execution of one or more operations that implement aspects described herein. For example, the instructions 316 can include instructions that implement one or more bias detection algorithms described herein. The memory 314 can also include a machine learning framework 400 having a bias that is being interrogated. Although shown as being part of a same computer 310 and memory 314, the bias detection instructions need not occupy the same computer 310 as the model or framework being analyzed. Instead, they may be part of different computers 310 part of the same or different computing environments. In many examples, the memory 314 is a non-transitory computer readable medium, such as random access memory, cache memory, read only memory, cache memory, registers, portable memory (e.g., enclosed drives or optical disks), mass storage devices, hard drives, solid state drives, other kinds of memory, or combinations thereof. In certain circumstances, transitory memory 314 can store information encoded in transient signals.

The one or more interfaces 318 are components that facilitate receiving input from and providing output to something external to the computer 310, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 318 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 318 can facilitate connection of the computing environment 300 to a network 302.

The computers 310 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

FIG. 4 illustrates an example machine learning framework 400 that techniques described herein may benefit from. A machine learning framework 400 is a collection of software and data that implements artificial intelligence trained to provide output, such as predictive data, based on input. The machine learning framework 400 may be utilized by the AI model bias detection system 100 of FIG. 1 as described herein. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 400 or components thereof are often built or refined from existing frameworks, such as TENSORFLOW by GOOGLE, INC. or PYTORCH by the PYTORCH community.

The machine learning framework 400 can include one or more models 402 that are the structured representation of learning and an interface 404 that supports use of the model 402.

The model 402 can take any of a variety of forms. In many examples, the model 402 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 402 can include a representation of memory (e.g., providing long short-term memory functionality). Where the set includes more than one model 402, the models 402 can be linked, cooperate, or compete to provide output.

The interface 404 can include software procedures (e.g., defined in a library) that facilitate the use of the model 402, such as by providing a way to establish and interact with the model 402. For instance, the software procedures can include software for receiving input, preparing input for use (e.g., by performing vector embedding, such as using Word2Vec, BERT, or another technique), processing the input with the model 402, providing output, training the model 402, performing inference with the model 402, fine tuning the model 402, other procedures, or combinations thereof.

In an example implementation, interface 404 can be used to facilitate a training method 410 that can include operation 412. Operation 412 includes establishing a model 402, such as initializing a model 402. The establishing can include setting up the model 402 for further use (e.g., by training or fine tuning). The model 402 can be initialized with values. In examples, the model 402 can be pretrained. Operation 414 can follow operation 412. Operation 414 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 402. Operation 416 can follow operation 414. Operation 416 includes providing a portion of the training data to the model 402. This can include providing the training data in a format usable by the model 402. The framework 400 (e.g., via the interface 404) can cause the model 402 to produce an output based on the input. Operation 418 can follow operation 416. Operation 418 includes comparing the expected output with the actual output. In an example, this can include applying a loss function to determine the difference between expected and actual. This value can be used to determine how training is progressing. Operation 420 can follow operation 418. Operation 420 includes updating the model 402 based on the result of the comparison. This can take any of a variety of forms depending on the nature of the model 402. Where the model 402 includes weights, the weights can be modified to increase the likelihood that the model 402 will produce correct output given an input. Depending on the model 402, backpropagation or other techniques can be used to update the model 402. Operation 422 can follow operation 420. Operation 422 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 414. If the stopping criterion has been satisfied, the flow can move to operation 422. Operation 422 includes deploying the trained model 402 for use in production, such as providing the trained model 402 with real-world input data and produce output data used in a real-world process. The model 402 can be stored in memory 314 of at least one computer 310, or distributed across memories of two or more such computers 310 for production of output data (e.g., predictive data).

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The disclosed examples are merely examples. Other ways to interrogate bias and express groups will be apparent to one of skill in the art having benefit of this disclosure. For instance, while examples herein described semantic relations to gender and established bias directions on a continuum between "male" and "female", there are many other ways that semantic relations to gender can be expressed, such as on a continuum between "masculine" and "feminine" or between "cisgender" and "transgender".

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

It is also noted that recitations herein of "at least one" component, element, etc., should not be used to create an inference that the alternative use of the articles "a" or "an" should be limited to a single component, element, etc. It is noted that recitations herein of a component of the present disclosure being "configured" or "programmed" in a particular way, to embody a particular property, or to function in a particular manner, are structural recitations, as opposed to recitations of intended use.

It is also noted that recitations herein of "at least one" component, element, etc., should not be used to create an inference that the alternative use of the articles "a" or "an" should be limited to a single component, element, etc. It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for producing an embedding model, the method comprising:
    receiving identification of a class;
    gathering or generating a plurality of pairs of words or tokens associated with the class;
    calculating a bias direction of the class in an embedding space, wherein calculating the bias direction includes:
        obtaining a corpus of token pairs related to the class;
        calculating token embeddings for each token of the token pairs of the corpus using the embedding model;
        performing principal component analysis on the embeddings such that variance associated with the class comes to lie on a first principal component that expresses a biased portion of a meaning of the tokens; and
        determining the bias direction using the first principal component;
    for respective tokens in a series of tokens, calculating a protected gradient score with respect to the bias direction;
    aggregating protected gradient scores of the respective tokens to form a series-level protected gradient score for the series of tokens;
    determining a fairness indicator based on the protected gradient score for the series; and
    responsive to the fairness indicator being above a threshold, permitting deployment of the embedding model.

2. The method of claim 1, wherein calculating the protected gradient score includes:
    calculating a directional derivative based on an output of an artificial intelligence model based on the token and with respect to the bias direction to generate a protected gradient; and
    calculating a dot product of the protected gradient and the bias direction, wherein the protected gradient score is based on the dot product.

3. The method of claim 1, further comprising:
    embedding a token in the embedding space using the embedding model.

4. The method of claim 1, further comprising, prior to the fairness indicator being above a threshold:
    determining that a prior fairness indicator is below the threshold and responsive thereto, remediating the embedding model.

5. The method of claim 1, wherein remediating the embedding model includes forming a new AI embedding using new or additional training data selected to reduce bias with respect to the class.

6. The method of claim 1, wherein the bias direction is or is defined by a set of two or more vectors expressing a bias subspace.

7. The method of claim 1, wherein the bias direction expresses continuum in multi-dimensional space such that movement along the bias direction modifies a contribution of bias with respect to the class.

8. The method of claim 1, further comprising:
    training a large language model using output from the embedding model.

9. The method of claim 1, further comprising:
    generate the series of tokens using a large language model.

10. The method of claim 1, further comprising:
    obtaining the series of tokens from a training or validation set.

11. The method of claim 1, wherein determining the fairness indicator includes determining the fairness indicator of an artificial intelligence model based on multiple series-level protected gradient scores calculated for respective different series.

12. The method of claim 1, wherein the protected gradient scores of the respective tokens are each a scalar value expressing an extent to which an embedding produced by the embedding model depends on a semantic association of the prediction with the protected class.

13. The method of claim 1, wherein the protected gradient scores of the tokens each represent a numerical amount of undesired sensitivity of the model to the biased component of the meaning of a respective token.

14. A method comprising:
- determining an artificial intelligence model to analyze, the artificial intelligence model relying on an embedding model;
- identifying a class;
- calculating a bias direction with respect to the class for the embedding model used by the artificial intelligence model, wherein to calculate the bias direction includes to:
  - obtaining a corpus of token pairs related to the class;
  - calculating token embeddings for each token of the corpus of token pairs using the embedding model;
  - performing principal component analysis on the embeddings such that variance associated with the class comes to lie on a first principal component that expresses a biased portion of a meaning of the tokens; and
  - determining the bias direction using the first principal component;
- obtaining a series of tokens;
- for each respective token in the series of tokens, calculating a protected gradient score, wherein calculating the protected gradient score includes:
  - calculating a directional derivative based on an output of the artificial intelligence model based on the token and with respect to the bias direction to generate a protected gradient; and
  - calculating a dot product of the protected gradient and the bias direction, wherein the protected gradient score is based on the dot product;
- aggregating the protected gradient scores of the respective tokens to form a protected gradient score for the series;
- determining a fairness indicator of the artificial intelligence model based on the protected gradient score for the series.

15. The method of claim 14, further comprising:
responsive to the fairness indicator being below a threshold, remediating one or both of the artificial intelligence model and the embedding model.

16. The method of claim 14, further comprising:
responsive to the fairness indicator being above the threshold, permitting deployment of the artificial intelligence model.

17. The method of claim 16, further comprising:
generating an output from the deployed artificial intelligence model.

18. The method of claim 14, further comprising:
cause a large language model to generate the series of tokens.

19. The method of claim 14, wherein the bias direction is or is defined by a set of two or more vectors expressing a bias subspace.

20. A system comprising:
one or more processors; and
a set of one or more non-transitory computer-readable media having stored thereon a trained model, wherein the trained model has a fairness indicator that passes a threshold as determined by a method comprising the steps of:
- receiving a set of tokens and an identification of a class;
- calculating a bias direction with respect to the class for an embedding model used by the trained model, wherein to calculate the bias direction includes to:
  - obtaining a corpus of token pairs related to the class;
  - calculating token embeddings for each token of the corpus of token pairs using the embedding model;
  - performing principal component analysis on the embeddings such that variance associated with the class comes to lie on a first principal component that expresses the biased portion of a meaning of the tokens; and
  - determining the bias direction using the first principal component;
- for each token in the set of tokens, calculating a protected gradient score, wherein calculating the protected gradient score includes to:
  - calculating a directional derivative based on an output of the embedding model based on the token and with respect to the bias direction to generate a protected gradient; and
  - calculating a dot product of the protected gradient and the bias direction, wherein the protected gradient score is based on the dot product;
- aggregating the protected gradient scores of the tokens to form a set-level protected gradient score; and
- determining the fairness indicator of the model based on the set-level protected gradient score, wherein determining the fairness indicator of the model based on the set-level protected gradient score includes determining the fairness indicator of the model based on multiple set-level protected gradient scores calculated for respective different sets of tokens.

* * * * *